United States Patent [19]

Kummer et al.

[11] Patent Number: 4,832,702
[45] Date of Patent: May 23, 1989

[54] POLYBUTYL- AND POLYISOBUTYLAMINES, THEIR PREPARATION, AND FUEL COMPOSITIONS CONTAINING THESE

[75] Inventors: Rudolf Kummer, Frankenthal; Dieter Franz, Ludwigshafen; Hans P. Rath, Gruenstadt, all of Fed. Rep. of Germany

[73] Assignee: BASF Aktiengesellschaft, Ludwigshafen, Fed. Rep. of Germany

[21] Appl. No.: 29,811

[22] Filed: Mar. 25, 1987

[30] Foreign Application Priority Data

Apr. 4, 1986 [DE] Fed. Rep. of Germany ....... 3611230

[51] Int. Cl.$^4$ ................................ C10L 1/22
[52] U.S. Cl. ........................................ 44/62; 44/63; 525/375; 525/379; 525/381; 528/392; 528/396; 528/422; 528/423
[58] Field of Search ............... 44/62, 63; 525/379, 525/381, 375; 528/392, 396, 422, 423

[56] References Cited

U.S. PATENT DOCUMENTS

| | | |
|---|---|---|
| 3,989,476 | 11/1976 | Abbott ................................ 44/62 |
| 4,134,344 | 1/1979 | DeVries et al. . |
| 4,178,259 | 12/1979 | King . |
| 4,202,784 | 5/1980 | Cahill et al. . |
| 4,312,965 | 1/1982 | Jachimowicz et al. . |
| 4,357,148 | 11/1982 | Graiff .................................. 44/62 |
| 4,678,479 | 7/1987 | Holmes et al. ..................... 44/62 |

FOREIGN PATENT DOCUMENTS

| | | |
|---|---|---|
| 1083610 | 9/1967 | United Kingdom . |
| 2136438 | 9/1984 | United Kingdom . |

*Primary Examiner*—Jacqueline V. Howard
*Attorney, Agent, or Firm*—Keil & Weinkauf

[57] ABSTRACT

The fuel or lubricant composition proposed contains one or more polybutyl or polyisobutylamines of the general formula I

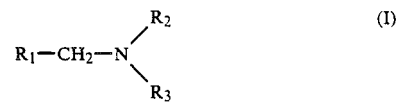

where $R_1$ is a polybutyl- or polyisobutyl radical derived from isobutene and up to 20% by weight of n-butene and $R_2$ and $R_3$ are identical or different and are each hydrogen, an aliphatic or aromatic hydrocarbon, a primary or secondary, aromatic or aliphatic aminoalkylene radical or polyaminoalkylene radical, a polyoxyalkylene radical or a hetaryl or heterocyclyl radical, or, together with the nitrogen atom to which they are bonded, form a ring in which further hetero atoms may be present.

7 Claims, No Drawings

POLYBUTYL-AND POLYISOBUTYLAMINES, THEIR PREPARATION, AND FUEL COMPOSITIONS CONTAINING THESE

The present invention relates to fuel and lubricant compositions which contain polybutyl- or polyisobutylamines, to certain polybutyl- or polyisobutylamines, and to a process for their preparation.

Polybutenylamines and their use as fuel and lubricant additives have been known for a very long time and are described in, for example, U.S. Pat. No. 3,275,554 and DE-A-No. 2,125,039.

The prior art polybutenylamines are prepared by halogenating polybutenes and reacting the halides with amines. The preparation of these products give rise to ionic halogen, which has to be removed as completely as possible.

There has therefore been no lack of attempts in the prior art to improve the known products, especially since the elimination of ionic halogen requires expensive measures and furthermore substantial amounts of halogen always remains in the reaction products (cf. DE-A-No. 2,245,918.)

DE-A-No. 2,702,604 describes reactive polyisobutenes which can be converted to mineral oil additives with maleic anhydride (MA) and oligo- or polyamines. The oil additives thus obtained have the great advantage that they are virtually halogen-free. The difficult addition reaction of MA (ene reaction) in combination with tar formation, i.e. undesirable byproducts, is a disadvantage.

It is an object of the present invention to provide fuel or lubricant compositions which prevent the formation of deposits in the intake system of internal combustion engines or have a particularly good dispersant effect.

We have found that this object is achieved by a fuel or lubricant composition which contains one or more polybutyl- or polyisobutylamines of the general formula I

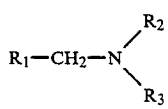
(I)

where $R_1$ is a polybutyl- or polyisobutyl radical derived from isobutene and up to 20% by weight of n-butene and $R_2$ and $R_3$ are identical or different and are each hydrogen, an aliphatic or aromatic hydrocarbon, a primary or secondary, aromatic or aliphatic aminoalkylene radical or polyaminoalkylene radical, a polyoxyalkylene radical or a hetaryl or heterocyclyl radical, or, together with the nitrogen atom to which they are bonded, form a ring in which further hetero atoms may be present.

A preferred embodiment of the invention provides a fuel or lubricant composition which contains compounds of the general formula I in which $R_1$ is a polybutyl or polyisobutyl radical derived from isobutene and up to 20% by weight of n-butene and $R_2$ and $R_3$ are identical or different and are each hydrogen, alkyl, aryl, hydroxyalkyl or an aminoalkylene radical of the general formula II

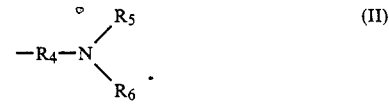
(II)

where $R_4$ is alkylene and $R_5$ and $R_6$ are identical or different and are each hydrogen, alkyl, aryl, hydroxy alkyl or polybutyl or polyisobutyl, a polyaminoalkylene radical of the general formula III

where the radicals $R_4$ are identical or different and the radicals $R_5$ are identical or different and $R_4$, $R_5$ and $R_6$ have the above meanings and m is an integer from 2 to 8, or a polyoxyalkylene radical of the general formula IV

where the radicals $R_4$ are identical or different and have the above meanings, X is alkyl or H, and n is an integer from 1 to 30, or where $R_2$ and $R_3$, together with the nitrogen atom to which they are bonded, form a morpholinyl, pyridyl, piperidyl, pyrrolyl, pyrimidinyl, pyrrolinyl, pyrrol-idinyl, pyrazinyl, or pyridazinyl radical.

A particulary preferred embodiment provides a fuel or lubricant composition which contains compounds of the general formula I

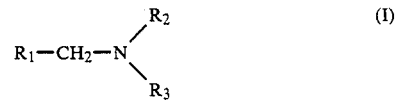
(I)

where $R_1$ is a polybutyl or polyisobutyl radical of 20 to 400 carbon atoms which is derived from isobutene and up to 20% by weight of n-butene, and $R_2$ and $R_3$ are identical or different and are each hydrogen, $C_1$–$C_{10}$-alkyl, phenyl, naphthyl, $C_1$–$C_{10}$-hydroxyalkyl, an aminoalkylene radical of the general formula II

(II)

where $R_4$ is $C_2$–$C_{10}$-alkylene and $R_5$ and $R_6$ are identical or different and are each hydrogen, $C_1$–$C_{10}$-alkyl, phenyl, naphthyl, $C_1$–$C_{10}$-hydroxyalkyl or polybutyl or polyisobutyl, each of 20 to 400 carbon atoms, a polyaminoalkylene radical of the general formula III

where the radicals $R_4$ are identical or different, the radicals $R_5$ are identical or different and $R_4$, $R_5$ and $R_6$ have the above meanings and m is an integer from 2 to 8, or a polyoxyalkylene radical of the general formula IV′

where the radicals $R_4$ are identical or different and have the above meanings and n is an integer from 1 to 30, or where $R_2$ and $R_3$, together with the nitrogen atom to which they are bonded, for a morpholinyl radical.

Another preferred embodiment provides a fuel or lubricant composition which contains compounds of the general formulae I to IV' in which $R_1$ is a polybutyl or polyisobutyl radical of 32 to 200 carbon atoms which is derived from isobutene and up to 20% by weight of n-butene, and $R_2$ and $R_3$ are identical or different and are each hydrogen, methyl, ethyl, n-propyl, isopropyl, n-butyl, sec-butyl, isobutyl, tert-butyl, pentyl, hexyl, phenyl,

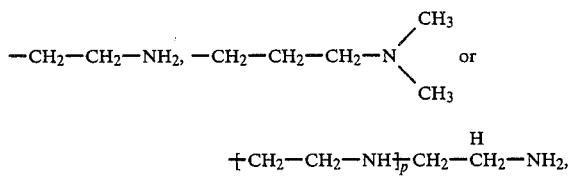

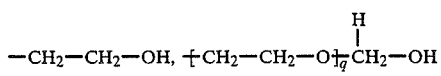

where p is an integer from 1 to 7, in particular from 1 to 3,

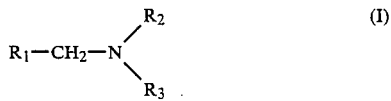

where q is an integer from 1 to 30, or, together with the nitrogen atom to which they are bonded, form a morpholinyl radical.

Since, in fuel additives, about 50% by weight of the active substance can be replaced by polyisobutene (PIB) without loss of efficiency, the addition of PIB is particularly advantageous from the point of view of cost. The polyisobutene may have a molecular weight $M_N$ of from 300 to 2000, preferably from 500 to 1500.

Where the invention relates to a fuel composition, i.e. a fuel for internal combustion engines, the polybutyl- or polyisobutylamine of the general formula I may be present, for example, in an amount of 10-2000, in particular 100-400, mg/kg of fuel.

In the novel lubricant composition, the polybutyl or polyisobutylamine may be present, for example, in an amount of 0.5-5, in particular 1-3, percent by weight, based on the total weight of the composition.

The present invention furthermore relates to polybutyl- or polyisobutylamines of the general formula I

where $R_1$ is a polybutyl or polyisobutyl radical of 20 to 400 carbon atoms which is derived from isobutene and up to 20% by weight of n-butene, and $R_2$ and $R_3$ are identical or different and are each hydrogen, $C_1$-$C_{10}$-alkyl, phenyl, naphthyl, $C_2$-$C_{10}$-hydroxyalkyl, an aminoalkylene radical of the general formula II

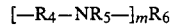

where $R_4$ is $C_1$-$C_{10}$-alkylene and $R_5$ and $R_6$ are identical or different and are each hydrogen, $C_1$-$C_{10}$-alkyl, phenyl, naphthyl, $C_1$-$C_{10}$-hydroxyalkyl or polybutyl or polyisobutyl, each of 20 to 400 carbon atoms, a polyaminoalkylene radical of the general formula III

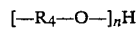

where the radicals $R_4$ are identical or different, the radicals $R_5$ are identical or different and $R_4$, $R_5$ and $R_6$ have the above meanings and m is an integer from 2 to 8, or a polyoxyalkylene radical of the general formula IV'

$$[-R_4-O-]_nH \qquad (IV')$$

where the radicals $R_4$ are identical or different and have the above meanings and n is an integer from 1 to 30, or where $R_2$ and $R_3$, together with the nitrogen atom to which they are bonded, form a morpholinyl radical, individually or as a mixture with one another.

The compounds of the general formula I can be prepared via the stage of the compounds of the general formula V by hydroformylating an appropriate polybutene or polyisobutene with a rhodium or cobalt catalyst in the presence of CO and $H_2$ at from 80° to 200° C. and CO/$H_2$ pressures of up to 600 bar and then subjecting the oxo product to a Mannich reaction or amination under hydrogenating conditions. The amination reaction is advantageously carried out at 80°–200° C. and under pressures up to 600, preferably 80–300, bar.

In the preparation process, it is advantageous to use a suitable, inert solvent in order to reduce the viscosity of the reaction mixture. Particularly suitable solvents are aliphatic, cycloaliphatic and aromatic hydrocarbons having a low sulfur content. Aliphatic solvents which are free of sulfur compounds and contain less than 1% of aromatics are particularly preferred. They have the advantage that, at high amination temperatures, no heat of hydrogenation is liberated and no hydrogen is consumed. In the amination and hydroformulation reaction, the solvent content is from 0 to 70% by weight, depending on the viscosity of the polymer and of the solvent. Greater dilutions are just as uneconomical as a change of solvent between the oxo reaction and the amination.

In the novel process, polybutene conversions of 80–90% can readily be achieved. The polybutene, which predominantly consist of isobutene units (the isobutene content is generally higher than 80% by weight), have, for example, a molecular weight $M_N$ of 300–5000, preferably 500–2500. According to the invention, reactive polybutenes, in particular polybutene A, B or C, can be used. A reactive polybutene is an unsaturated polymer of high chemical purity, more than 10% of the double bonds being in the α position. One method of preparing such polybutenes is described in German Patent No. 2,702,604. A polymer prepared in this manner contains about 60% of α-olefin and 30% of α-olefin, which is trisubstituted.

Moderately reactive polybutenes are generally obtained by polymerization of isobutene and isobutene-containing $C_4$-cuts with aluminum-containing catalysts, are less chemically pure and contain only small amounts of α-olefin, generally less than 10%. The $^{13}C$ NMR signals show the difference. The tri-substituted, chemically pure β-component amounts to about 40% in polybutene B, and the α-olefin component to about 10%. Polybutene A must after all be regarded as not very reactive and does not contain any significant amounts of chemically pure components.

Particularly suitable polybutenes and polyisobutenes for the preparation of the novel polyamides of the general formula I and of the novel alcohols of the general formula V are those which have a mean degree of polymerization P of from 10 to 100 and whose content E of double bonds which are capable of reacting with maleic anhydride is from 60 to 90%. A value E of 100% corresponds to the calculated theoretical value where each molecule of the butene or isobutene polymer contains one reactive double bond of this type. The value is calculated for a reaction of polyisobutene with maleic anhydride in a weight ratio of 5:1, the stirred mixture being heated for 4 hours at 200° C. Further details in this context are given in GB-A-No. 1,592,016, which is hereby incorporated by reference.

The polybutenes are commercial products.

The oxo product formed in the hydroformulation is usually in the form of an aldehyde/alcohol mixture. It can be further processed as a mixture or, for reasons relating to the shelf life, can be completely hydrogenated beforehand. Fully hydrogenated products are less reactive.

The present invention furthermore relates to the polybutyl or polyisobutyl alcohols which are formed in the hydroformylation described and are of the general formula V

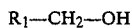
(V)

where $R_1$ is a polybutyl or polyisobutyl radical derived from isobutene and up to 20% by weight of n-butene. These compounds can be used, for example, as intermediates for the preparation of the compounds of the general formula I. They are formed, as described above, by hydroformylation of the polybutenes already described. Polybutyl or polyisobutyl alcohols of the formula V where $R_1$ has 20 to 400 carbon atoms, are particularly preferred.

For economic reasons, polybutyl- or polyisobutylamines of the general formula I where $R_2$ and $R_3$ are each hydrogen, are suitable for the fuel sector, i.e. for use in the novel fuel compositions, particularly as valve-cleaning additives or additives for keeping valves clean. The polybutyl- or polyisobutylamines of the general formula I are advantageously used as a fuel additive in an amount of 10-2000, preferably 50-800, mg/kg. An optimum effect can be achieved where added in an amount of 100-400 ppm to fuel for internal combustion engines. Smaller amounts can be metered in and have an equally good effect if the nitrogen content is increased, particularly by using polyamines, for example dimethylaminopropylamine, or polybutyl- or polyisobutylamines of the general formula I containing low molecular weight polybutyl or polyisobutyl moieties, and in addition conventional carriers, for example polybutene, polybutyl alcohol, brightstock or other mineral oils, are metered in. The use of polyamines, such as diethylenetriamine to pentaethylenehexamine, tends to give carburettor detergents or ash-free dispersants for lubricating oils.

The halogen content of the novel polybutyl- or polyisobutylamines corresponds to that of the starting materials and is generally less than 30 mg/kg.

Compounds of the general formula I which contain hydroxyl groups are of particular interest as fuel additives.

The novel fuel or lubricant composition has a number of advantages over the prior art, for example the fact that the compounds in question are saturated compounds, no corrosion problems occur, synthesis is more economical and causes less environmental pollution, and the products are not contaminated by chlorine or bromine.

The examples which follow illustrate the invention.

EXAMPLE 1

500 g of polybutene having a molecular weight $M_N$ of 950, 300 g of dodecane and 2.8 g of cobalt-octacarbonyl are heated for 5 hours at 185° C. in a 2.5 l lift-type stirred autoclave under a 1:1 $CO/H_2$ mixture under 280 bar, while stirring. Thereafter, the mixture is cooled to room temperature, the catalyst is removed with 400 ml of 10% strength aqueous acetic acid and the mixture is then washed neutral. The resulting oxo product is treated with 1 l of ammonia, 300 g of ethanol and 100 g of Raney cobalt in a 5 l rotating autoclave under a hydrogen pressure of 200 bar at 180° C. for 5 hours. After the mixture has cooled, the catalyst is separated off by filtration, the excess ammonia is evaporated and the solvent is removed by distillation.

The polybutene used in this example is a highly reactive polybutene C prepared according to DE-A-No. 2,702,604.

The polybutene conversion is shown in the Table below.

EXAMPLE 2

The procedure described in Example 1 is followed, the hydroformylation being carried out at a temperature of only 120° C. with 0.5 g of rhodium dicarbonyl acetylacetonate as the catalyst. Instead of the ammonia, dimethylaminopropylamine is used. The reaction temperature during the amination stage is only 80° C. The fact that the hydroformulation reaction predominantly gives the aldehyde facilitates the conversion with dimethylaminopropylamine. The excess amine is removed by distillation, together with the solvent.

EXAMPLES 3, 4 and 5

The general method described in Example 1 is used, dimethylaminopropylamine being used as the amine component. A fairly unreactive polybutene (referred to as polybutyene A) is used as the polybutene in Example 3, a moderately reactive polybutene B in Example 4 and a highly reactive polybutene C in Example 5. These polybutenes have a molecular weight $M_N$ of 900-1000. As in Example 1, the conversion is determined by preparative column chromatography over silica gel and gravimetric measurement of the evaporated hexane fraction, which contains only unconverted polybutene. The purity of this fraction is found from the base number and nitrogen determination.

EXAMPLE 6

The procedure described in Example 1 is followed, except that 2.8 g of cobalt octacarbonyl is used as the catalyst. The amine component is tetraethylenepentamine.

COMPARATIVE EXAMPLES A and B

The prior art products were prepared by chlorination of polybutene C and dehydrohalogenation according to U.S. Pat. No 3,275,554, Example 1. In the case of Comparative Example B, the synthesis route via polybutylene chloride gave a lower conversion than that according to the invention, in agreement with DE-A-No. 2, 245,918.

The possibility of using the substances, prepared as described above, in fuel compositions and lubricant compositions was investigated. Examples 1 to 5 and Comparative Example A are concerned with investigations into additive-containing fuel, while Example 6 and Comparative Example B relate to lubricant compositions.

The valve-cleaning action of the additive-containing fuels was assessed from valve deposits in an Opel Kadell 1.2 l engine in a standard test according to CEC method F-02-C79 after 40 hours. The dispersant effect for lubricating oils was determined by the spot method described by A. Schilling in Les Huiles Pour Moteurs et le Graissage des Moteurs, 1 (1962), 89–90.

The data listed in Tables 1 and 2 below show that the novel fuel or lubricant composition has a superior valve-cleaning action or dispersant effect compared with the prior art.

where $R_4$ is $C_1$-$C_{10}$-alkylene and $R_5$ and $R_6$ are identical or different and are each hydrogen, $C_1$-$C_{10}$-alkyl, phenyl, naphthyl, $C_2$-$C_{10}$-hydroxyalkyl or polybutyl or polyisobutyl, each of 20 to 400 carbon atoms, a polyaminoalkylene radical of the formula III $$[-R_4\text{-}NR_5-]_m R_6 \qquad (III)$$

TABLE 1

| Example | Polybutene | Starting amines | Synthesis route | Hydroformylation temperature | Conversion (%) | Amount of additive | Valve deposit (basic value 400 mg per valve) |
|---|---|---|---|---|---|---|---|
| 1 | C | $NH_3$ | X | 185 | 81 | 300 ppm | 0 |
| 2 | C | dimethyl-aminopropylamine | X | 120 | 59 | 300 ppm | 18 |
| 3 | A | dimethyl-aminopropylamine | X | 185 | 36 | 300 ppm | 16 |
| 4 | B | dimethyl-aminopropylamine | X | 185 | 52 | 300 ppm | 38 |
| 5 | C | dimethyl-aminopropylamine | X | 185 | 73 | 300 ppm | 0 |
| Comparative Example A | C | dimethyl-aminopropylamine | Y | — | 55 | 300 ppm | 56 |

TABLE 2

| Example | Polybutene | Starting amines | Synthesis route | Hydroformylation temperture | Conversion (%) | Amount of additive | Dispersant assessment Good = 600–800 |
|---|---|---|---|---|---|---|---|
| 6 | C | tetra-ethylenepentamine | X | 120 | 60 | 3% | 780 |
| Comparative Example B | C | tetra-ethylenepentamine | Y | — | 39 | 3% | 540 |

X = According to the invention
Y = According to US-A-4 275 554

We claim:

1. A polybutyl- or polyisobutylamine of the formula I

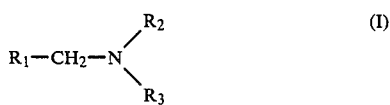

where $R_1$ is a polybutyl or polyisobutyl radical of 20 to 400 carbon atoms which is derived from isobutene and up to 20% by weight of n-butene, and $R_2$ and $R_3$ are identical or different and are each hydrogen, $C_1$-$C_{10}$-alkyl, phenyl, naphthyl, $C_2$-$C_{10}$-hydroxyalkyl, and aminoalkylene radical of the formula II where the radicals $R_4$ are identical or different, the radicals $R_5$ are identical or different and $R_4$, $R_5$ and $R_6$ have the above meanings and m is an integer from 1 to 7, or a polyoxyalkylene radical of the formula IV'

$$[-R_4-O-]_n H \qquad (IV')$$

where the radicals $R_4$ are identical or different and have the above meanings and n is an integer from 1 to 30, or where $R_2$ and $R_3$, together with the nitrogen atom to which they are bonded, form a morpholinyl radical, individually or as a mixture with one another said polybutyl- or polyisobutylamines having been prepared by hydroformylating a polybutene or polyisobutene with a rhodium or cobalt catalyst in the presence of CO and $H_2$ at from 80° to 200° C. and under a Co/$H_2$ pressure of up to 600 bar and then subjecting the oxo product to a Mannich reaction or amination under hydrogenating conditions.

2. A fuel composition for internal combustion engines which contains in an amount of from 10 to 2000 ppm based on the total weight of the composition one or more polybutyl- or polyisobutylamines of the formula I

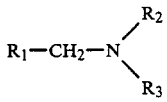

where $R_1$ is a polybutyl- or polyisobutyl radical of 32 to 200 carbon atoms derived from isobutene and up to 20% by weight of n-butene and $R_2$ and $R_3$ are each hydrogen, an aliphatic or aromatic hydrocarbon, a primary or secondary, aromatic or aliphatic aminoalkylene radical or a polyaminoalkylene radical, a polyoxyalkylene radical or a hetaryl or heterocyclyl radical, or, together with the nitrogen atom to which they are bonded, form a ring in which further hetero atoms may be present, said polybutyl- or polyisobuytylamines having been prepared by hydroformylating a polybutene or polyisobutene with a rhodium or cobalt catalyst in the presence of CO and $H_2$ at from 80° to 200° C. and under a $CO/H_2$ pressure of up to 600 bar and then subjecting the oxo product to a Mannich reaction or amination under hydrogenating conditions.

3. A fuel composition for internal combustion engines as defined in claim 2, wherein $R_2$ and $R_3$ represent hydrogen.

4. A fuel composition for internal combustion engines as claimed in claim 1, wherein $R_1$ has the meanings given in claim 1 and $R_2$ and $R_3$ are identical or different and are each hydrogen, alkyl, aryl, hydroxyalkyl, an aminoalkylene radical of the formula II an aminoalkylene radical of the general formula II

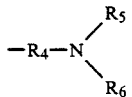

where $R_4$ is alkylene and $R_5$ and $R_6$ are identical or different and are each hydrogen, alkyl, aryl, hydroxyalkyl or polybutyl or polyisobutyl, a polyaminoalkylene radical of the formula III

where the radicals $R_4$ are identical or different and the radicals $R_5$ are identical or different and $R_4$, $R_5$ and $R_6$ have the above meanings and m is an integer from 2 to 8, or a polyoxyalkylene radical of the formula IV

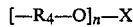

where the radicals $R_4$ are identical or different and have the above meanings, X is alkyl or H, and n is an integer from 1 to 30, or where $R_2$ and $R_3$, together with the nitrogen atom to which they are bonded, for a morpholinyl, pyridyl, piperidyl, pyrrolyl, pyrimidinyl, pyrrolinyl, pyrrolidinyl, pyrazinyl or pyridazinyl radical.

5. A fuel composition for internal combustion engines as claimed in claim 1 of the formula I

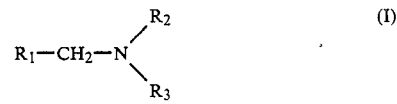

where $R_1$ is a polybutyl or polyisobutyl radical of 20 to 400 carbom atoms which is drived from isobutene and up to 20% by weight of n-butene, and $R_2$ and $R_3$ are identical or different and are each hydrogen, $C_1$-$C_{10}$-alkyl, phenyl, naphthyl, $C_1$-$C_{10}$-hydroxyalkyl, an aminoalkylene radical of the formula II

where $R_4$ is $C_2$-$C_{10}$-alkylene and $R_5$ and $R_6$ are identical or different and are each hydrogen, $C_1$-$C_{10}$-alkyl, phenyl, naphthyl, $C_1$-$C_{10}$-hydroxyalkyl or polybutyl or polyisobutyl, each of 20 to 400 carbon atoms, a polyaminoalkylene radical of the formula III

where the radicals $R_4$ are identical or different, the radicals $R_5$ are identical or different and $R_4$, $R_5$ and $R_6$ have the above meanings and m is an integer from 2 to 8, or a polyoxyalkylene radical of the formula IV'

where the radicals $R_4$ are identical or different and have the above meanings and n is an integer from 1 to 30, or where $R_2$ and $R_3$, together with the nitrogen atom to which they are bonded, form a morpholinyl radical.

6. A fuel composition for internal combustion engine for the formulae I to IV' as claimed in claim 2, wherein $R_1$ is a polybutyl or polyisobutyl radical of 35 to 200 carbon atoms which is derived from isobutene and up to 20% by weight of n-butene, and $R_2$ and $R_3$ are identical or different and are each hydrogen, methyl, ethyl, n-propyl, isopropyl, n-butyl, sec-butyl, isobutyl, tert-butyl, pentyl, hexyl, phenyl,

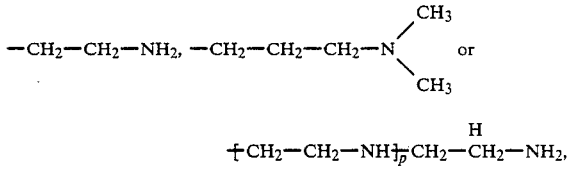

where p is an integer from 1 to 7, in particular from 1 to 3,

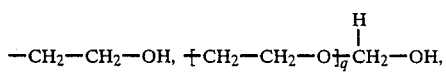

where q is an integer from 1 to 30, or, together with the nitrogen atom to which they are bonded, form a morpholinyl radical.

7. A fuel composition as claimed in claim 6, which contains the polybutyl- or polyisobutylamine in an amount of from 100 to 400 ppm, based on the total weight of the composition.

* * * * *